(12) United States Patent
Transier et al.

(10) Patent No.: US 12,007,986 B2
(45) Date of Patent: Jun. 11, 2024

(54) AGGREGATION OVER HIGH-CARDINALITY DIMENSIONS USING UNIQUENESS INDICES

(71) Applicant: SAP SE, Walldorf (DE)

(72) Inventors: Frederik Transier, Heidelberg (DE); Kai Stammerjohann, Wiesloch (DE)

(73) Assignee: SAP SE, Walldorf (DE)

( * ) Notice: Subject to any disclaimer, the term of this patent is extended or adjusted under 35 U.S.C. 154(b) by 62 days.

(21) Appl. No.: 17/829,695

(22) Filed: Jun. 1, 2022

(65) Prior Publication Data

US 2023/0394039 A1 Dec. 7, 2023

(51) Int. Cl.
*G06F 17/00* (2019.01)
*G06F 16/22* (2019.01)
*G06F 16/242* (2019.01)

(52) U.S. Cl.
CPC .......... *G06F 16/244* (2019.01); *G06F 16/221* (2019.01); *G06F 16/2255* (2019.01)

(58) Field of Classification Search
CPC .. G06F 16/221; G06F 16/2255; G06F 16/244; G06F 16/24556
See application file for complete search history.

(56) References Cited

U.S. PATENT DOCUMENTS

| | | | | |
|---|---|---|---|---|
| 5,761,653 A * | 6/1998 | Schiefer | ............ | G06F 16/24545 |
| | | | | 707/769 |
| 6,064,999 A * | 5/2000 | Dalal | ............ | G06F 16/284 |
| | | | | 707/999.102 |
| 10,853,371 B2 * | 12/2020 | Chavan | ............ | G06F 16/24537 |
| 2004/0122814 A1 * | 6/2004 | Zhang | ............ | G06F 16/24539 |
| 2013/0132333 A1 * | 5/2013 | De Smet | ............ | G06F 16/244 |
| | | | | 707/600 |
| 2017/0277748 A1 * | 9/2017 | Bagehorn | ............ | G06F 16/22 |
| 2018/0137175 A1 * | 5/2018 | Teodorescu | ............ | G06F 16/9566 |
| 2019/0171634 A1 * | 6/2019 | Nowakiewicz | ............ | G06F 16/244 |
| 2021/0224257 A1 * | 7/2021 | Fender | ............ | G06F 16/24534 |

OTHER PUBLICATIONS

S. Finkelstein, M. Schkolnick, and P. Tiberio. 1988. Physical database design for relational databases. ACM Trans. Database Syst. 13, 1 (Mar. 1988), 91-128. <https://doi.org/10.1145/42201.42205>Mar. 1988.*

(Continued)

*Primary Examiner* — Greta L Robinson
(74) *Attorney, Agent, or Firm* — Buckley, Maschoff & Talwalkar LLC

(57) ABSTRACT

A system includes reception of a query specifying a database table, an aggregate function, a plurality of grouping columns and an aggregation column, determination of whether a tuple of a first row of the grouping columns in the database tables is unique in the grouping columns, storage, if it is determined that the tuple of the first row of the grouping columns is unique in the grouping columns, of a result set entry including the tuple and an aggregation value determined based on a value of the aggregation column in the first row, and, if it is determined that the tuple of the first row of the grouping columns is not unique in the grouping columns, determination of a key based on the tuple and performance of a hash lookup using the key.

17 Claims, 7 Drawing Sheets

(56) References Cited

OTHER PUBLICATIONS

Huayu Wu, Tok Wang Ling, Liang Xu, and Zhifeng Bao. 2009. Performing grouping and aggregate functions in XML queries. In Proceedings of the 18th international conference on World wide web (WWW '09). Association for Computing , 1001-1010. < https://doi.org/10.1145/1526709.15268>, Apr. 2009.*

Gultekin Özsouoğlu, Victor Matos, and Meral Özsoyoğlu. Query processing techniques in the summary-table-by-example database query language. ACM Trans. Database Syst. 14, 4, 526-573 .< https://doi.org/10.1145/76902.76906>, Dec. 1989.*

* cited by examiner

|  OID  | Price |
|---|---|
| 0 | 25 |
| 1 | 10 |
| 2 | 50 |
| 3 | 10 |
| 4 | 75 |

*FIG. 7*

| OID | PID | Price |
|---|---|---|
| 0 | 1 | 25 |
| 1 | 1 | 10 |
| 2 | 2 | 50 |
| 3 | 1 | 10 |
| 4 | 2 | 25 |
| 4 | 4 | 50 |

*FIG. 8*

| Index_OID |
|---|
| 0 |
| 0 |
| 1 |
| 1 |
| 1 |
| 0 |
| 0 |

| Index_PID |
|---|
| 0 |
| 0 |
| 0 |
| 0 |
| 0 |
| 0 |
| 1 |

*FIG. 9*

AGGREGATION OVER HIGH-CARDINALITY DIMENSIONS USING UNIQUENESS INDICES

BACKGROUND

A database typically stores large amounts of data in the form of database tables. Client applications access this data by transmitting queries to the database. For example, a database receives a query from a client application, generates a query execution plan, executes the query execution plan upon its database tables, and returns a result set to the client application.

Modern databases such as, for example, OnLine Analytical Processing (OLAP) databases may store tables including millions or billions of rows. Such tables may be queried using an aggregate function (e.g., SUM, COUNT), thereby requiring the database to execute the aggregate function with respect to each of the rows. Accordingly, execution of such queries is computationally expensive, particularly in the case of high-cardinality grouping columns (i.e., the table columns over which the aggregation is to occur) such as, for example, order_id, user_id, or account_number.

Systems are desired to improve the efficiency of execution of an aggregate function over one or more columns of a database table.

BRIEF DESCRIPTION OF THE DRAWINGS

FIG. 7 is a tabular representation of a result set generated according to some embodiments.

FIG. 8 is a tabular representation of a result set generated according to some embodiments.

FIG. 9 is a tabular representation of uniqueness indices according to some embodiments.

DETAILED DESCRIPTION

The following description is provided to enable any person in the art to make and use the described embodiments and sets forth the best mode contemplated for carrying out some embodiments. Various modifications, however, will be readily apparent to those in the art.

Briefly, some embodiments execute a query including an aggregate function on a table by bypassing conventional aggregation execution for those rows of the table which include unique value(s) in the grouping column(s) of the query, and performing conventional aggregation execution for the other rows. The aggregation of the rows which include unique value(s) in the grouping column(s) of the query may simply include copying of the value of the aggregation column or an initialized value, depending on the type of aggregate function, to the result set.

In order to determine the rows which include unique value(s) in the grouping column(s), some embodiments maintain an index for each of one or more columns of the table. Each row of an index corresponds to a row of a column and includes a one-bit value indicating whether the value in the row of the column is unique (e.g., 1) or not unique (e.g., 0) within the column. Indices may be maintained for columns which exhibit high cardinality and/or which are expected to be used as grouping columns in received queries. In the case of persisted database tables, the indices may be computed in advance of productive operation. Embodiments may therefore reduce the computational cost of otherwise expensive aggregations in exchange for indices with small space requirements and the computational overhead of determining, based on the indices, whether or not to bypass conventional aggregation.

Figure 1:
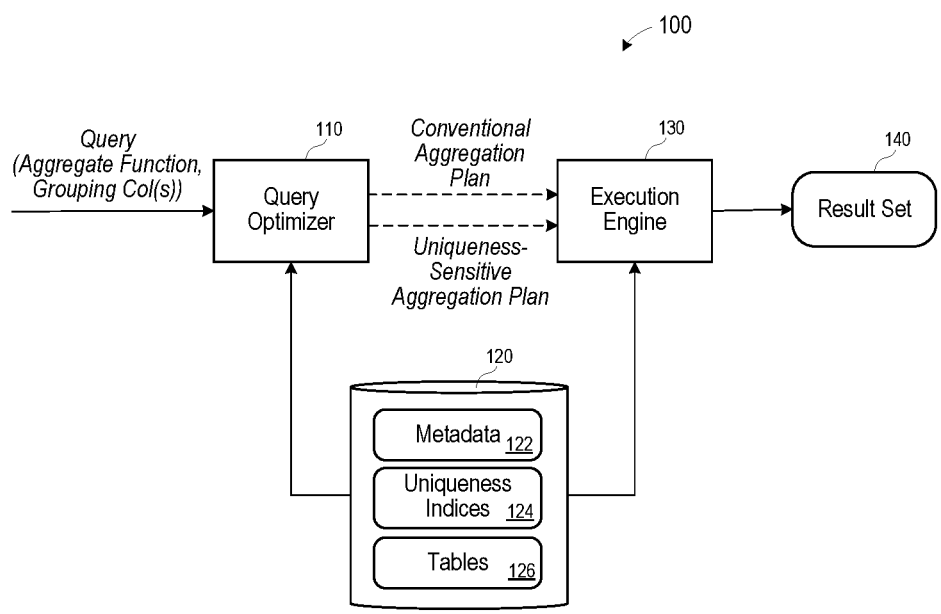
FIG. 1 is a block diagram of a system to implement uniqueness-sensitive aggregation according to some embodiments.

FIG. 1 is a block diagram of system 100 to implement uniqueness-sensitive aggregation according to some embodiments. Each illustrated element of system 100 may be implemented using any suitable combination of computing hardware and/or software that is or becomes known. System 100 may comprise components of a standalone or distributed (i.e., multi-node) database system. In some embodiments, two or more elements of system 100 are implemented by a single computing device. One or more elements of system 100 may be implemented as a cloud service (e.g., Software-as-a-Service, Platform-as-a-Service).

Query optimizer 110 receives a query from a client application (not shown). Embodiments are not limited to any particular client or to any particular query language. The query includes an aggregate function (e.g., SUM, AVG, MIN, MAX, COUNT) and specifies one or more grouping columns. For example, the query SELECT OID, PID, SUM (Price) FROM TABLEA GROUP BY OID, PID includes aggregate function SUM and specifies grouping columns OID, PID. The column to be aggregated (i.e., Price) will be referred to herein as the aggregation column of the query.

Query optimizer 110 operates to generate a query execution plan based on the query and on metadata 122 of database storage system 120. Metadata 122 may define the structure and relationships (i.e., a database schema) of tables 126. A developer may use metadata 122 to flag one or more columns of one or more tables as a potential grouping column.

Metadata 122 may also include statistics which represent the data stored within tables 126. These statistics may be periodically refreshed by a statistics server (not shown) of system 100. The statistics may specify the cardinality of various columns of tables 126. According to known dictionary compression techniques, a dictionary may store each unique value within a given table column and the cardinality of the column may be determined by counting the number of entries in the dictionary.

Each of uniqueness indices 124 corresponds to a column of a table 126. Each row of an index 124 corresponds to a row of its corresponding column and includes a one-bit value indicating whether the value in the row of the column is unique or not unique within the column. A uniqueness index 124 may be maintained in database storage system 120 for columns which have been flagged as potential grouping columns for aggregate functions, columns which exhibit high cardinality, columns which share both of the former characteristics, or any other suitable columns.

According to some embodiments, query optimizer 110 generates either a conventional aggregation plan or a uniqueness-sensitive aggregation plan based on whether one or more of the grouping columns of the query correspond to a uniqueness index 124. As will be described in detail below, a uniqueness-sensitive aggregation plan bypasses conventional aggregation execution for those rows of the table which includes a unique tuple in the one or more grouping columns of the query, and performs conventional aggregation execution on the other rows.

Execution engine 130 receives the aggregation plan from query optimizer 110. In a case that the received plan is a conventional aggregation plan, execution engine 130 operates to aggregate the aggregation column of each row of the table using hashmap lookups based on the grouping columns, as is known in the art, to generate result set 140. In a case that the received plan is a uniqueness-sensitive aggregation plan, any rows which include unique values in the grouping columns of the query are identified and then aggregated by copying the value of the aggregation column or an initialized value to result set 140.

Figure 2A:
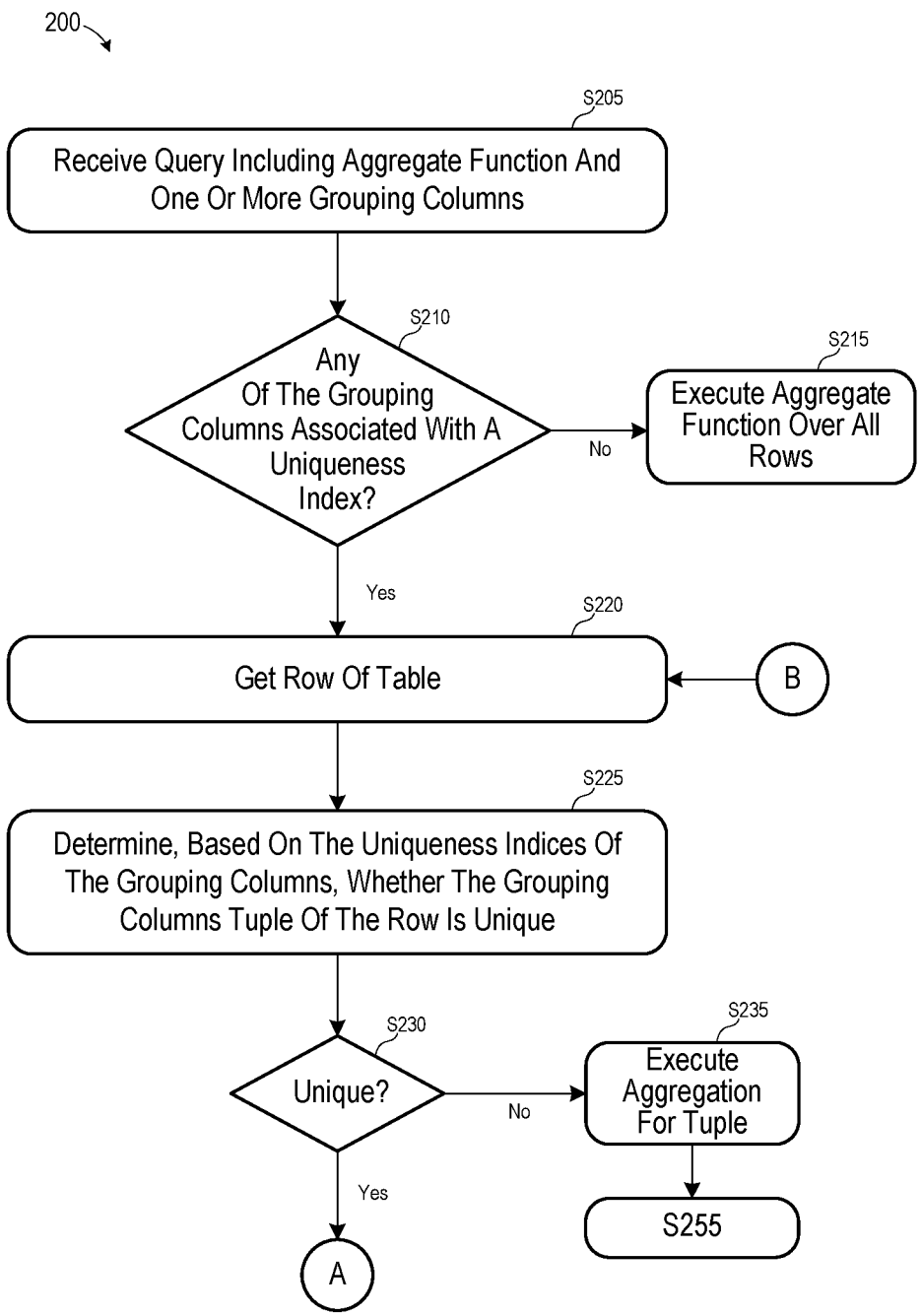
FIGS. 2A and 2B comprise a flow diagram to perform uniqueness-sensitive aggregation according to some embodiments. is a diagram illustrating a query execution plan according to some embodiments.
Figure 2B:
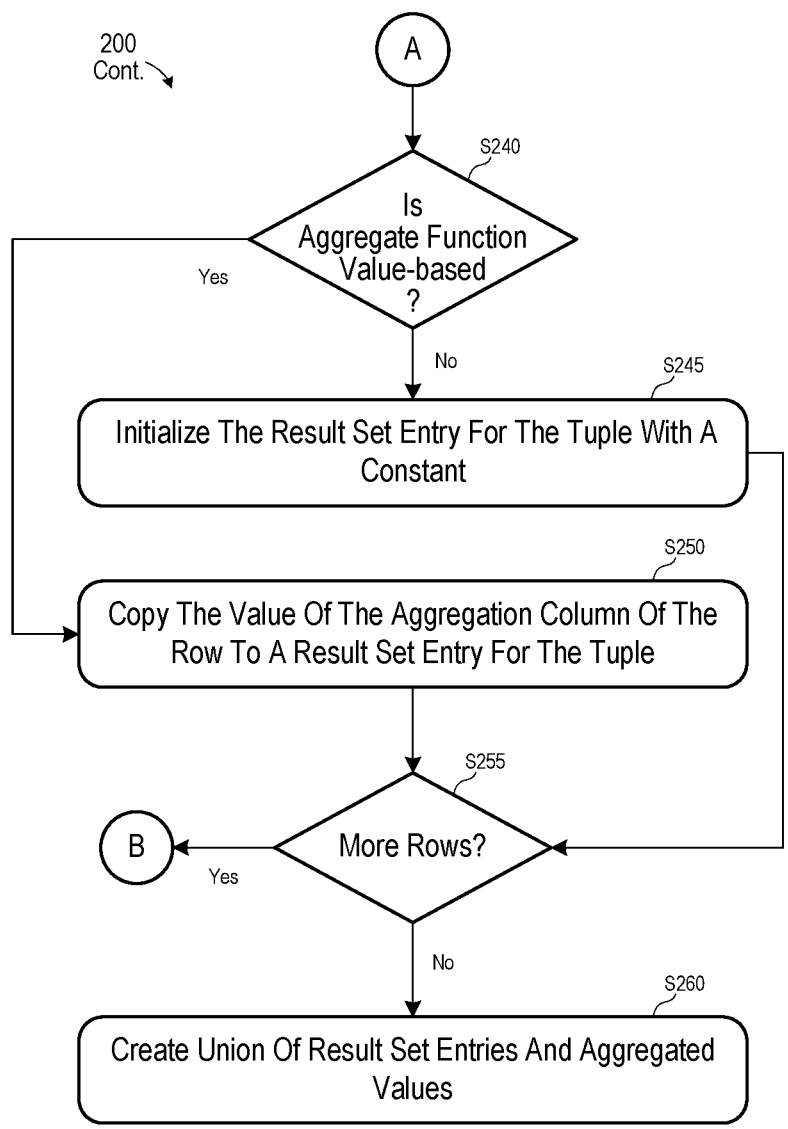

FIGS. 2A and 2B comprises a flow diagram of process 200 according to some embodiments. In some embodiments, various hardware elements of system 100 execute program code to perform process 200. Process 200 and all other processes mentioned herein may be embodied in processor-executable program code read from one or more non-transitory computer-readable media, such as a hard disk drive, a volatile or non-volatile random access memory, a DVD-ROM, a Flash drive, and a magnetic tape, and may be executed by one or more processing units, including but not limited to hardware processors, processor cores, and processor threads. In some embodiments, hard-wired circuitry may be used in place of, or in combination with, program code for implementation of processes according to some embodiments. Embodiments are therefore not limited to any specific combination of hardware and software.

A query is initially received at S205. The query specifies a table, an aggregate function and one or more grouping columns as is known in the art. The received query also specifies a column of the table whose values are to be aggregated, i.e., an aggregation column. The query may be received from any client application by any form of query processor. According to some embodiments, the query is received by a query optimizer of an SQL server. The query may therefore comprise an SQL query, but embodiments are not limited thereto.

Next, at S210, it is determined whether any of the one or more grouping columns are associated with a uniqueness index. The determination at S210 may comprise review of metadata associated with each grouping column of the query to determine whether any of the grouping columns are flagged as being associated with a uniqueness index. S210 may alternatively comprise searching stored uniqueness indices for an index associated with any of the grouping columns.

Flow proceeds to S215 if it is determined at S210 that none of the one or more grouping columns are associated with a uniqueness index. At S215, the aggregate function of the query is executed over all rows of the table in any manner known in the art. With reference to system 100, S205 and S210 may be performed by query optimizer 110. If the determination at S210 is negative, query optimizer 110 transmits a conventional aggregation plan to execution engine 130. Then, at S215, execution engine 130 executes the aggregate function of the query over all rows of the table.

In one example of S215, the values of the grouping columns of a given row are concatenated and a hash function is applied thereto to determine a hashmap key. If the key doesn't exist in the hashmap, the key is added to the hashmap and the value of the aggregation column of the row is associated with the key. In a case that the aggregation function is COUNT, the value 1 (or other suitable initial value) is associated with the key. If the key exists in the hashmap, the value of the aggregation column of the row is aggregated with the value currently associated with the key. The foregoing process is performed for each row of the table and the final aggregated values associated with each grouping column tuple are then read out from the hashmap.

Flow proceeds to S220 if it is determined at S210 that at least one of the one or more grouping columns is associated with a uniqueness index. Again referring to system 100, query optimizer 110 may transmit a uniqueness-sensitive aggregation plan to execution engine 130 if the determination at S210 is negative, in response to which execution engine 130 executes S220 through S260.

A row of the table is retrieved at S220. Next, at S225, it is determined whether the grouping columns tuple of the row is unique. The determination at S225 is based on the uniqueness indices of the grouping columns.

Figures 3, 4:
FIG. 3 is a tabular representation of a database table according to some embodiments.
FIG. 4 is a tabular representation of a uniqueness index according to some embodiments.

FIG. 3 is a tabular representation of table 300 according to some embodiments. It will be assumed that table 300 is named TABLEA and the query received at S205 is: SELECT OID, SUM(Price) FROM TABLEA GROUP BY OID. It will also be assumed that uniqueness index 400 of FIG. 4 is associated with column OID of TABLEA. As shown, each row of index 400 includes a one-bit value indicating whether the value in the corresponding row of column OID is unique or not unique within the column.

Taking the first row of table 300 as an example, it is determined at S225 that the grouping columns tuple (i.e., the value 0 of grouping column OID) is not unique because the corresponding row of index 400 includes "0". Flow therefore proceeds through S230 to S235, where the conventional aggregation process is performed for the grouping column tuple as described above. Flow continues to S255 where it is determined whether the table includes more rows. If so, flow returns to S220 to get a next row of the table.

Continuing the present example, the second row of table 300 is retrieved at S220 and it is determined at S225 whether the grouping columns tuple of the row is unique. Again, index 400 indicates that the tuple (i.e., the value 0 of grouping column OID) is not unique and aggregation is performed at S235. In this example, since the key formed by OID value 0 was entered in the hashmap during the previous iteration of S235, the value of the aggregation column of the second row of table 300 (i.e., 15) is added to the value (i.e., 10) which was stored during the previous iteration.

Flow returns to S220 to retrieve a third row of table 300. At S225, and based on the value "1" of the third row of index 400, it is determined that the grouping columns tuple of the corresponding row of table 300 is unique. Flow therefore proceeds through S230 to S240. At S240, it is determined whether the aggregate function of the query is value-based. As defined herein, the result of a value-based function depends on the particular values which are aggregated. For example, the aggregate functions SUM, MIN, MAX, AVG all produce a result whose value depends on the values being aggregated. In contrast, the result of the aggregate function COUNT depends on the number of aggregated values rather than the values themselves.

Figures 5, 6:
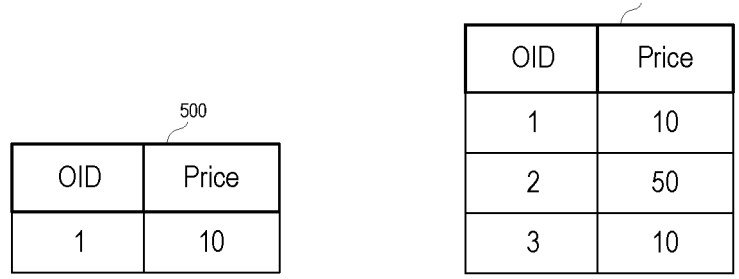
FIG. 5 is a tabular representation of a result set entry generated according to some embodiments.
FIG. 6 is a tabular representation of result set entries generated according to some embodiments.

The aggregate function Sum of the present example is value-based. Therefore, at S250, the value of the aggregation column of the row is copied to a result set entry associated with the tuple. Table 500 of FIG. 5 shows such a result set entry. If it were determined at S240 that the aggregate function of the query is not value-based, flow would alternatively flow to S245 to initialize the result entry for the tuple with a constant. For example, in the case of the COUNT aggregate function, the constant may be "1".

Flow continues from S245 or S250 to S255, and returns to S220 as long as rows remain in the table. Once all rows of table 300 have been processed, result set entries have been created for each unique grouping column tuple as shown in FIG. 6. The aggregated values of the other grouping column tuples of table 300 are stored in the hashmap. Accordingly, a union of the result set entries and the aggregated values is created at S260 to produce the result set of the query.

According to some embodiments, query optimizer 110 generates either a conventional aggregation plan or a uniqueness-sensitive aggregation plan based on whether one or more of the grouping columns of the query correspond to a uniqueness index 124. As will be described in detail below, a uniqueness-sensitive aggregation plan bypasses conventional aggregation execution for those rows of the table which includes a unique tuple in the one or more grouping columns of the query, and performs conventional aggregation execution on the other rows. FIG. 7 shows result set 700 according to the present example, in which table 500 of result set entries are unioned with the aggregated values associated with non-unique OID values 0 and 4.

Process 200 may operate in a case where less than all of the grouping columns are associated with a uniqueness index. For example, it is assumed that the received query is SELECT OID, PID, SUM(Price) FROM TABLEA GROUP BY OID, PID, and that only grouping column OID (and not grouping column PID) is associated with a uniqueness index. In such a case, the determination at S225 of whether the grouping columns tuple is unique is based on the uniqueness index of grouping column OID and not on the grouping column PID (for which no index exists). However, any aggregation at S235, initializing at S245 or copying at S250 is performed with respect to the full grouping column tuple [OID, PID]. Accordingly, FIG. 8 shows result set 800 of the above query created at S260 by the union of result set entries and aggregated values.

In a case where two or more of the grouping columns are associated with a uniqueness index, the determination at S225 of whether the grouping columns tuple of a row is unique is based on all available grouping column uniqueness indices. For example, it is assumed that the received query is SELECT OID, PID, SUM(Price) FROM TABLEA GROUP BY OID, PID, that grouping column OID is associated with index 400 of FIG. 9 and that grouping column PID is associated with index 900 of FIG. 9.

In order to determine whether a grouping columns tuple of a row is unique at S225, the values corresponding to the row in all indices are subjected to a logical OR operation. Accordingly, a grouping columns tuple of a row is determined to be unique if any grouping column value of the row is unique. In the present example, the final result set is as shown in FIG. 8 (because the query is unchanged from that described with respect to FIG. 8), but no aggregation is performed with respect to the last row of table 300 because index 900 indicates that the value of PID in the last row of table 300 (i.e., 4) is unique.

Figure 10:
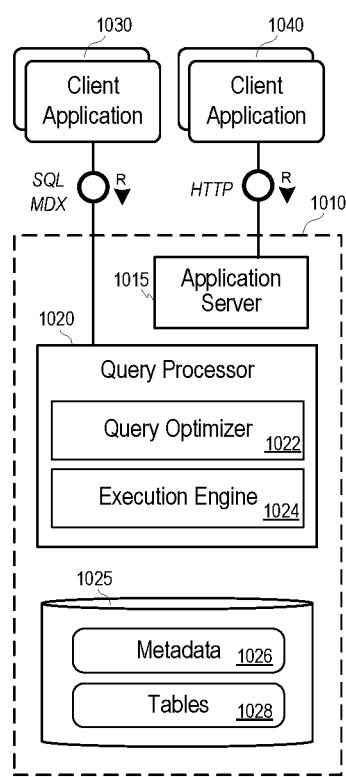
FIG. 10 is a block diagram of a database node according to some embodiments.

FIG. 10 is a block diagram of a database architecture according to some embodiments. Embodiments are not limited to the FIG. 10 architecture.

Server node 1010 may receive a query including an aggregate function from one of client applications 1030 and 1040 and return results thereto based on data stored within server node 1010. Node 1010 executes program code to provide application server 1015 and query processor 1020. Application server 1015 provides services for executing server applications. For example, Web applications executing on application server 1015 may receive Hypertext Transfer Protocol (HTTP) requests from client applications 1040 as shown in FIG. 10.

Query processor 1020 may include stored data and engines for processing the data. Query processor 1020 may also be responsible for processing SQL and Multi-Dimensional eXpression (MDX) statements and may receive such statements directly from client applications 1030.

Query processor 1020 includes query optimizer 1022 for use in determining query execution plans and execution engine 1024 for executing query execution plans against tables 1028 of storage system 1025. Such execution may utilize uniqueness indices associated with grouping columns of a query as described herein. Query processor 1020 may also include a statistics server (not shown) in some embodiments for determining column cardinalities and the like.

Metadata 1026 includes data describing a database schema to which tables 1028 confirm. Metadata 1026 may therefore describe the columns and properties of tables 1028, the properties of each column of each table 1028, the interrelations between the columns, and any other suitable information. Metadata 1026 may indicate whether a column is associated with a uniqueness index. Metadata 1026 may identify one or more columns of tables 1028 as dictionary-compressed and include information for locating the column dictionary and dictionary indices associated with each dictionary-compressed column.

The data of storage system 1025 may comprise one or more of conventional tabular data, row-stored data, column-stored data, and object-based data. Moreover, the data may be indexed and/or selectively replicated in an index to allow fast searching and retrieval thereof. Server node 1010 may support multi-tenancy to separately support multiple unrelated clients by providing multiple logical database systems which are programmatically isolated from one another.

Server node 1010 may implement storage system 1025 as an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 11:
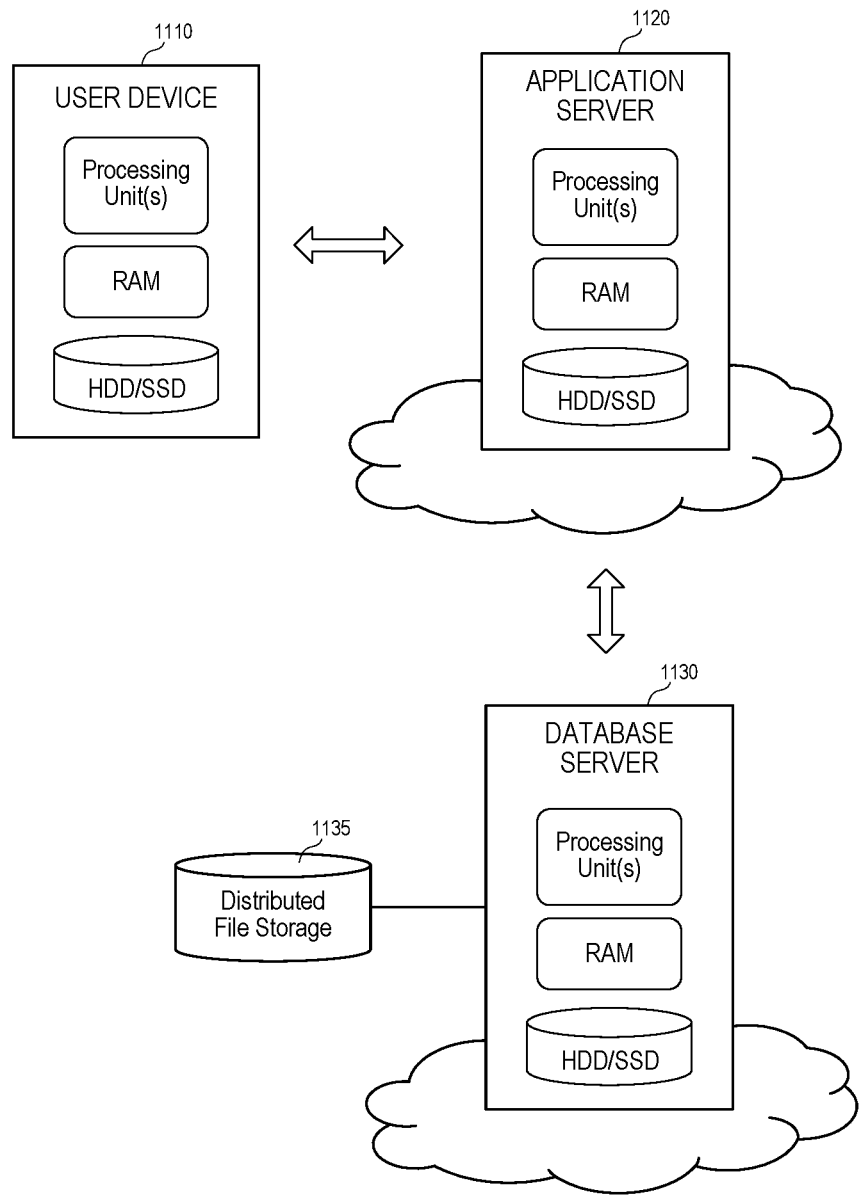
FIG. 11 is a view of a cloud-based architecture according to some embodiments.

FIG. 11 illustrates a cloud-based database deployment according to some embodiments. The illustrated components may reside in one or more public clouds providing self-service and immediate provisioning, autoscaling, security, compliance and identity management features.

User device 1110 may interact with applications executing on application server 1120, for example via a Web Browser executing on user device 1110, in order to create, read, update and delete data managed by database server 1130 and persisted in distributed file storage system 1135. Database server 1130 may store data and may execute processes as described herein to perform aggregations on the data as described herein. Application server 1120 and/or database server 1130 may comprise cloud-based compute resources, such as virtual machines, allocated by a public cloud provider. As such, application server 1120 and database server 1130 may exhibit demand-based elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation described herein may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory or Read Only Memory storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
a storage system storing a plurality of database tables; and
a server to:
receive a query specifying one of the plurality of database tables, an aggregate function, a grouping column and an aggregation column; and
in response to the received query:
determine a uniqueness index associated with the grouping column, where each row of the uniqueness index corresponds to a row of the grouping column and indicates whether the value in the row of the grouping column is unique or not unique within the column;
determine whether a row of the uniqueness index corresponding to a first row of the grouping column indicates that a first value of the first row of the grouping column is unique in the grouping column;
if it is determined that the first value of the first row of the grouping column is unique in the grouping column, store a result set entry including the first value and an aggregation value determined based on a value of the aggregation column in the first row; and
if it is determined that the first value of the first row of the grouping column is not unique in the grouping column, determine a key based on the first value and perform a hash lookup using the key.

2. A system according to claim 1, wherein the aggregate function is COUNT and the aggregation value is 1.

3. A system according to claim 1, wherein the aggregate function is a value-based function and the aggregation value is the value of the aggregation column in the first row.

4. A system according to claim 1, wherein the query specifies a second grouping column in the one of the plurality of database tables,
wherein determination of whether a first value of a first row of the grouping column in the one of the plurality of database tables is unique in the grouping column comprises determination of whether a second value of the first row of the second grouping column is unique in the second grouping column,
wherein the result set entry includes the second value and is stored if it is determined that the first value of the first row of the grouping column is unique in the grouping column or the second value of the first row of the second grouping column is unique in the second grouping column, and
wherein if it is determined that the first value of the first row of the grouping column is not unique in the grouping column and the second value of the first row of the second grouping column is unique in the second grouping column, the key is determined based on the first value and the second value and the hash lookup is performed using the key.

5. A system according to claim 4,
wherein determination of whether the second value of the first row of the second grouping column is unique in the second grouping column comprises:
determination of a second uniqueness index associated with the second grouping column, where each row of the second uniqueness index corresponds to a row of the second grouping column and indicates whether the value in the row of the second grouping column is unique or not unique within the second grouping column; and
determination of whether a row of the second uniqueness index corresponding to the first row of the second grouping column indicates that the second value is unique in the second grouping column.

6. A system according to claim 5, wherein each row of the uniqueness index and the second the uniqueness index comprises a one-bit value, the server further to:
perform an OR operation on the value of the row of the uniqueness index corresponding to the first row of the grouping column and the value of the row of the second uniqueness index corresponding to the first row of the second grouping column.

7. A method comprising:
receiving a query specifying a database table, an aggregate function, a plurality of grouping columns and an aggregation column;
determining a uniqueness index associated with each of the plurality of grouping columns, where each row of each uniqueness index corresponds to a row of the grouping column associated with the uniqueness index and indicates whether the value in the row of the associated grouping column is unique or not unique within the associated grouping column;

determining whether a tuple of a first row of the grouping columns in the database tables is unique in the grouping columns based on the determined uniqueness indices;

if it is determined that the tuple of the first row of the grouping columns is unique in the grouping columns, storing a result set entry including the tuple and an aggregation value determined based on a value of the aggregation column in the first row; and if it is determined that the tuple of the first row of the grouping columns is not unique in the grouping columns, determining a key based on the tuple and perform a hash lookup using the key.

8. A method according to claim 7, wherein each row of each determined uniqueness index comprises a one-bit value, and wherein determination of whether the tuple of the first row of the grouping columns is unique in the grouping columns comprises:

performing an OR operation on the values of the row of each uniqueness index corresponding to the first row.

9. A method according to claim 8, wherein the aggregate function is COUNT and the aggregation value is 1.

10. A method according to claim 8, wherein the aggregate function is a value-based function and the aggregation value is the value of the aggregation column in the first row.

11. A method according to claim 7, wherein the aggregate function is COUNT and the aggregation value is 1.

12. A method according to claim 7, wherein the aggregate function is a value-based function and the aggregation value is the value of the aggregation column in the first row.

13. A non-transitory medium storing processor-executable program code, the program code executable by a computing system to cause the computing system to:

receive a query specifying a database table, an aggregate function, one or more grouping columns and an aggregation column;

determine a uniqueness index associated with each of the one or more grouping columns, where each row of each uniqueness index corresponds to a row of the grouping column associated with the uniqueness index and indicates whether the value in the row of the associated grouping column is unique or not unique within the associated grouping column;

determine whether a tuple of a first row of the one or more grouping columns in the database tables is unique in the one or more grouping columns based on the uniqueness indices;

if it is determined that the tuple of the first row of the grouping columns is unique in the one or more grouping columns, store a result set entry including the tuple and an aggregation value determined based on a value of the aggregation column in the first row; and if it is determined that the tuple of the first row of the one or more grouping columns is not unique in the one or more grouping columns, determine a key based on the tuple and perform a hash lookup using the key.

14. A medium according to claim 13, wherein each row of each determined uniqueness index comprises a one-bit value, and wherein determination of whether the tuple of the first row of the grouping columns is unique in the one or more grouping columns comprises:

performing an OR operation on the values of the row of each uniqueness index corresponding to the first row.

15. A medium according to claim 14, wherein the aggregate function is a value-based function and the aggregation value is the value of the aggregation column in the first row.

16. A medium according to claim 13, wherein the aggregate function is COUNT and the aggregation value is 1.

17. A medium according to claim 13, wherein the aggregate function is a value-based function and the aggregation value is the value of the aggregation column in the first row.

\* \* \* \* \*